(12) United States Patent
Shimizu et al.

(10) Patent No.: US 11,842,116 B2
(45) Date of Patent: Dec. 12, 2023

(54) SCREEN DATA GENERATING SYSTEM, SCREEN DATA GENERATING METHOD, AND PROGRAM

(71) Applicant: Mitsubishi Electric Corporation, Tokyo (JP)

(72) Inventors: Yuki Shimizu, Tokyo (JP); Yasuaki Goto, Nagoya (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 94 days.

(21) Appl. No.: 17/435,392

(22) PCT Filed: Apr. 25, 2019

(86) PCT No.: PCT/JP2019/017814
§ 371 (c)(1),
(2) Date: Sep. 1, 2021

(87) PCT Pub. No.: WO2020/217435
PCT Pub. Date: Oct. 29, 2020

(65) Prior Publication Data
US 2022/0147296 A1 May 12, 2022

(51) Int. Cl.
*G06F 3/14* (2006.01)
*G06F 40/137* (2020.01)
(Continued)

(52) U.S. Cl.
CPC ............ *G06F 3/14* (2013.01); *G05B 23/0205* (2013.01); *G06F 40/137* (2020.01);
(Continued)

(58) Field of Classification Search
CPC ..... G05B 19/058; G05B 23/0205; G06F 3/14; G06F 40/137; G06F 40/186; G09G 5/14; H04L 67/125; G06T 11/60
See application file for complete search history.

(56) References Cited

U.S. PATENT DOCUMENTS

2012/0290107 A1* 11/2012 Carlson .............. G05B 19/058
700/83
2015/0032419 A1 1/2015 Tobori
(Continued)

FOREIGN PATENT DOCUMENTS

EP           1420308 A2 * 5/2004 ....... G05B 19/41885
JP       2002-333917 A    11/2002
(Continued)

OTHER PUBLICATIONS

"Control system, program thereof and recording medium", published on Apr. 11, 2007, Document ID: JP-3904865-B2, pp. 17 (Year: 2007).*

(Continued)

*Primary Examiner* — Chau T Nguyen
(74) *Attorney, Agent, or Firm* — XSENSUS LLP

(57) ABSTRACT

A screen data generating system (100) includes: a generation device (10) to generate screen data for displaying a monitoring screen (101) used for monitoring an operating state of a control device (30) that controls an apparatus (40); and a server (20) to acquire, from the control device (30), device identification information for identifying the control device (30) and unit configuration information about a unit included in the control device (30) to provide the acquired device identification information and the acquired unit configuration information. The generation device (10) includes a template storage to store multiple templates of the screen data, and generates, from a template including the unit configuration information provided by the server (20), the screen data relating to the control device indicated by the device identification information provided by the server (20).

11 Claims, 19 Drawing Sheets

(51) Int. Cl.
  *G06F 40/186* (2020.01)
  *G05B 23/02* (2006.01)
  *G06T 11/60* (2006.01)
  *H04L 67/125* (2022.01)

(52) U.S. Cl.
  CPC ............ *G06F 40/186* (2020.01); *G06T 11/60* (2013.01); *H04L 67/125* (2013.01)

(56) References Cited

U.S. PATENT DOCUMENTS

| 2015/0220076 A1 | 8/2015 | Uchida |
| 2018/0088541 A1 | 3/2018 | Sangi |

FOREIGN PATENT DOCUMENTS

| JP | 2004-30345 A | 1/2004 |
| JP | 2007-179115 A | 7/2007 |
| JP | 2010-160582 A | 7/2010 |
| JP | 2010-272034 A | 12/2010 |
| JP | 2012-141722 A | 7/2012 |
| JP | 2018-515865 A | 6/2018 |
| WO | 2013/150618 A1 | 10/2013 |
| WO | 2014/064819 A1 | 5/2014 |
| WO | 2016/155856 A1 | 10/2016 |

OTHER PUBLICATIONS

Ryo Uchida, "System Building Assistance Tool and System", published on May 1, 2014, Document ID: WO-2014064819-A1, pp. 16 (Year: 2014).*

International Search Report and Written Opinion dated Jul. 30, 2019, received for PCT Application PCT/JP2019/017814, Filed on Apr. 25, 2019, 9 pages including English Translation.

Notice of Reasons for Refusal dated Aug. 11, 2020, received for JP Application 2020-528369, 4 pages including English Translation.

Office Action dated Dec. 23, 2022, in corresponding Indian patent Application No. 202127041999, 7 pages.

* cited by examiner

FIG.7

| \tUNIT CONFIGURATION INFORMATION | | SETTING INFORMATION | |
|---|---|---|---|
| TYPE | MODEL NAME | TAG NAME | DEVICE ADDRESS |
| BASE UNIT | TYPE-BASE66 | POWER | A100 |
| BASE UNIT | TYPE-BASE67 | POWER | A110 |
| ⋮ | ⋮ | ⋮ | ⋮ |
| CPU | TYPE-CPU77 | READY | D100 |
| CPU | TYPE-CPU77 | ERROR | D200 |
| CPU | TYPE-CPU77 | ERROR CODE | D300 |
| CPU | TYPE-CPU77 | RUN/STOP | D400 |
| CPU | TYPE-CPU78 | READY | D100 |
| ⋮ | ⋮ | ⋮ | ⋮ |
| NETWORK UNIT | TYPE-NW88 | ONLINE | N100 |
| NETWORK UNIT | TYPE-NW89 | ONLINE | N200 |
| ⋮ | ⋮ | ⋮ | ⋮ |
| ANALOG UNIT | TYPE-AN99 | ERROR | X500 |
| ANALOG UNIT | TYPE-AN100 | ERROR | X500 |
| ⋮ | ⋮ | ⋮ | ⋮ |
| I/O UNIT | TYPE-I/O111 | ERROR | Z10 |
| ⋮ | ⋮ | ⋮ | ⋮ |

SETTING INFORMATION STORAGE AREA (232)

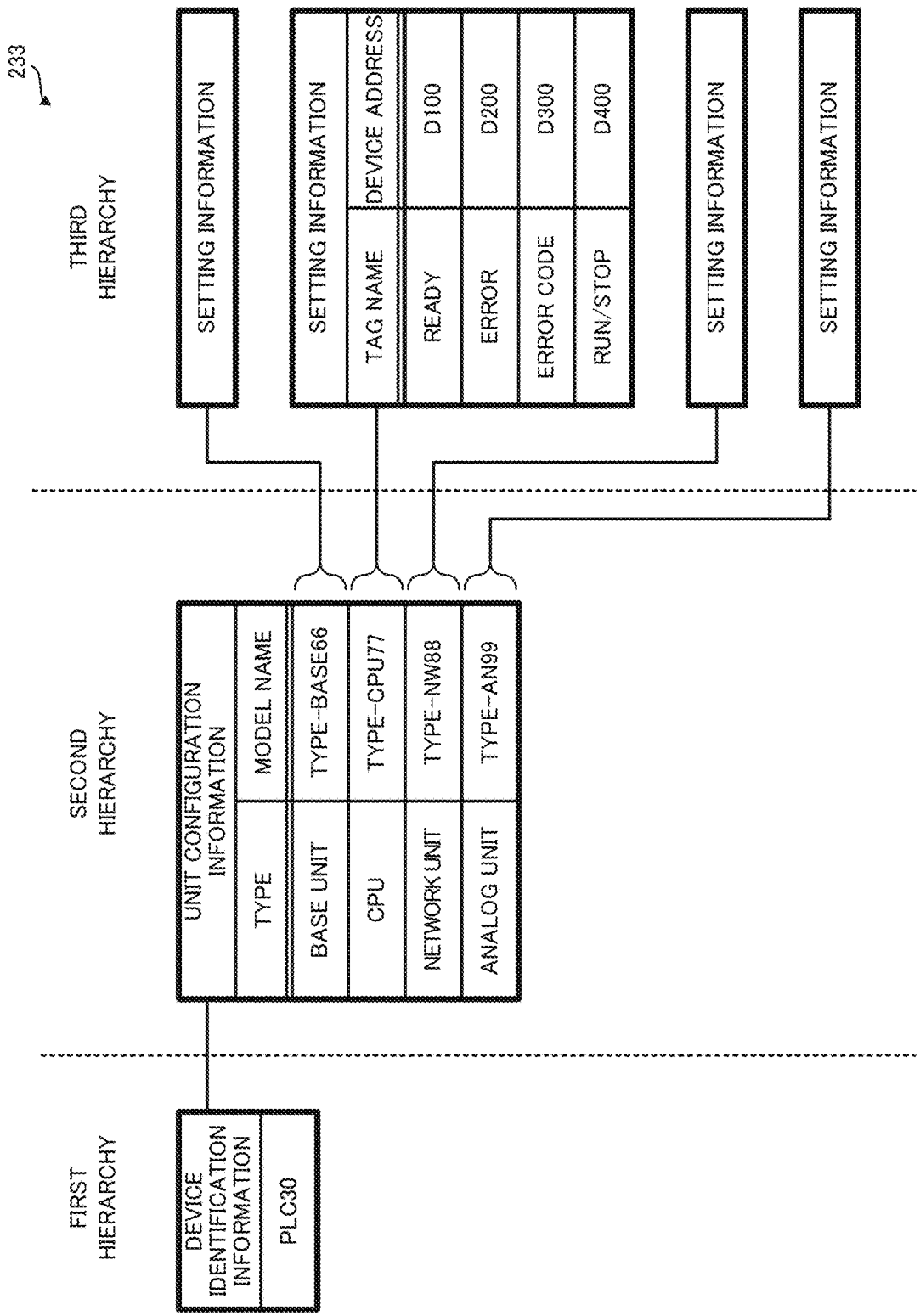

| TEMPLATE | | | |
|---|---|---|---|
| CONFIGURATION PROPERTY | MODEL NAME PROPERTY | UNIT FILE PROPERTY | DETAILED INFORMATION |
| BASE UNIT | TYPE-BASE66 | PATH A | ... |
| CPU | TYPE-CPU77 | PATH B | ... |
| NETWORK UNIT | TYPE-NW88 | PATH C | ... |
| ANALOG UNIT | TYPE-AN99 | PATH D | ... |

STORING

| UNIT CONFIGURATION INFORMATION (SECOND HIERARCHY) | |
|---|---|
| TYPE | MODEL NAME |
| BASE UNIT | TYPE-BASE66 |
| CPU | TYPE-CPU77 |
| NETWORK UNIT | TYPE-NW88 |
| ANALOG UNIT | TYPE-AN99 |

SCREEN DATA GENERATING SYSTEM, SCREEN DATA GENERATING METHOD, AND PROGRAM

CROSS-REFERENCE TO RELATED APPLICATION

The present application is based on PCT filing PCT/JP2019/017814, filed Apr. 25, 2019, the entire contents of which are incorporated herein by reference.

TECHNICAL FIELD

The present disclosure relates to a screen data generating system, a screen data generating method and a program.

BACKGROUND ART

In a plant in the field of instrumentation, when an abnormality occurs in a control system, a network or an apparatus that is a location of occurrence of the abnormality in the control system is identified using a monitoring screen that displays the configuration of the control system. Such a monitoring screen is created as a screen suitable for the control system when constructing the control system. Since an operating state including the abnormality of the apparatus is displayed on a screen in order to create a monitoring screen, the work of assigning an acquisition destination to a part on the screen and drawing the monitoring screen is to be carried out after grasping the acquisition destination of the data indicating the operating state.

Accordingly, the use of a technique for setting a monitoring screen from information of another application is conceivable (refer to, for example, Patent Literature 1). Patent Literature 1 discloses linking of setting data of a monitoring screen with an apparatus using a list of information about the apparatus extracted from information determined by upstream design such as a piping instrumentation diagram.

CITATION LIST

Patent Literature

Patent Literature 1: International Publication No. WO 2014/064819

SUMMARY OF INVENTION

Technical Problem

However, in addition to the upstream design such as the piping instrumentation diagram, the work of the technique of Patent Literature 1 requires extraction of an apparatus from information determined by the upstream design. Accordingly, there is room for reducing work load of preparing the monitoring screen.

In consideration of the aforementioned circumstances, an objective of the present disclosure is to reduce the work load of preparing the monitoring screen.

Solution to Problem

In order to attain the aforementioned objective, a screen data generating system of the present disclosure includes (i) generation means for generating screen data for displaying a monitoring screen used for monitoring an operating state of a control device that controls an apparatus and (ii) a server to acquire, from the control device, device identification information for identifying the control device and unit configuration information relating to a unit included in the control device to provide the acquired device identification information and the acquired unit configuration information. The generation means (i) includes template storage means for storing a template of the screen data and (ii) generates, from the template including the unit configuration information provided by the server, the screen data relating to the control device indicated by the device identification information provided by the server.

Advantageous Effects of Invention

According to the present disclosure, the server acquires, from the control device, the device identification information and the unit configuration information, and the generation means generates, from the template including the unit configuration information, the screen data relating to the control device indicated by the device identification information. Accordingly, work of creating the monitoring screen can be greatly simplified. As a result, work load of preparing the monitoring screen can be reduced.

BRIEF DESCRIPTION OF DRAWINGS

FIG. 7 is a drawing illustrating information stored in a setting information storage area according to the embodiment;

FIG. 8 is a drawing illustrating hierarchization information according to the embodiment;

DESCRIPTION OF EMBODIMENTS

A screen data generating system 100 according to an embodiment of the present disclosure is described below in detail with reference to drawings.

Embodiment

Figure 1:
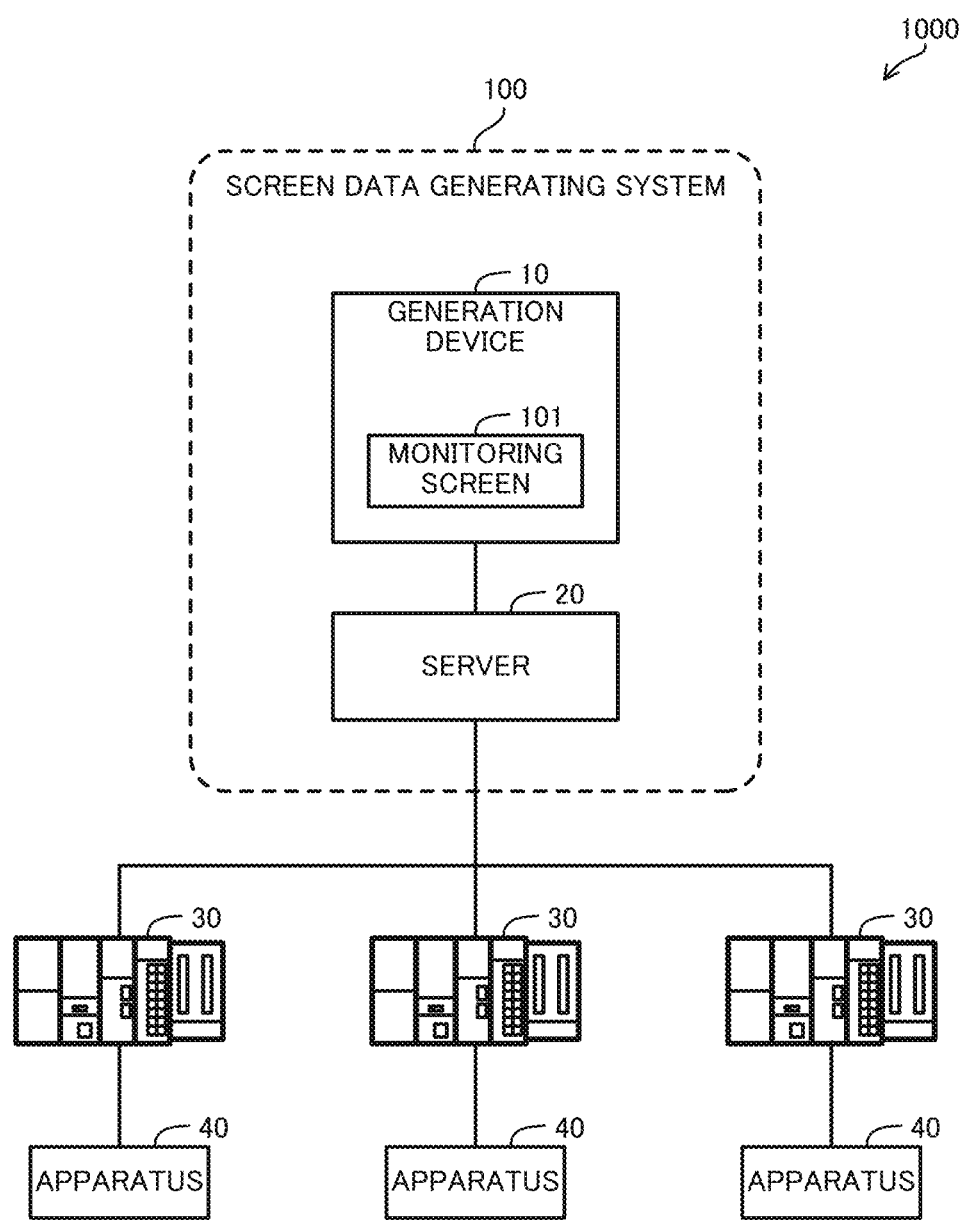
FIG. 1 is a drawing illustrating a configuration of a control system according to an embodiment of the present disclosure.

The screen data generating system 100 according to the present embodiment corresponds to a part of a control system 1000 installed in a factory. The control system 1000 is a factory automation (FA) system typified by a production system, an inspection system, and a processing system. As illustrated in FIG. 1, the control system 1000 includes (i) multiple control devices 30 that control apparatuses 40 and (ii) the screen data generating system 100 as a monitoring system that monitors an operating state of each of the control devices 30.

The control devices 30 are industrial controllers typified by a programmable logic controller (PLC). Each of the apparatuses 40 controlled by the control devices 30 is, for example, a sensor, an actuator, or a robot. The control of the apparatuses 40 by the control devices 30 may include collecting sensing results obtained by communicating with the apparatuses 40 that are sensors.

The screen data generating system 100 includes (i) a generation device 10 that generates screen data for displaying a monitoring screen 101 used for monitoring the operating states of the control devices 30 and (ii) a server 20 that acquires, from the control devices 30, information about the control devices 30 and provides the acquired information in response to an external request.

The generation device 10 is a personal computer (PC) typified by an industrial personal computer (IPC) or a mobile terminal that can be carried by a user. The generation device 10 is one example of generation means for generating screen data for displaying a monitoring screen in the screen data generating system 100. The generation device 10 displays the operating states of the control devices 30 in real time by generating screen data and then updating the displayed content of the monitoring screen as needed. The generation device 10 is connected to the server 20 by a dedicated line typified by a universal serial bus (USB) and communicates with the server 20.

The server 20 is a computer device having a server function. The server 20 is one example of server means that acquires information from the control devices 30 in the screen data generating system 100 to provide the acquired information. The server 20 is implemented as a database management system (DBMS) server that complies with, for example, open platform communication unified architecture (OPC UA). The server 20 is connected to the control devices 30 via an FA network typified by a field network and communicates with the control devices 30.

Figure 2:
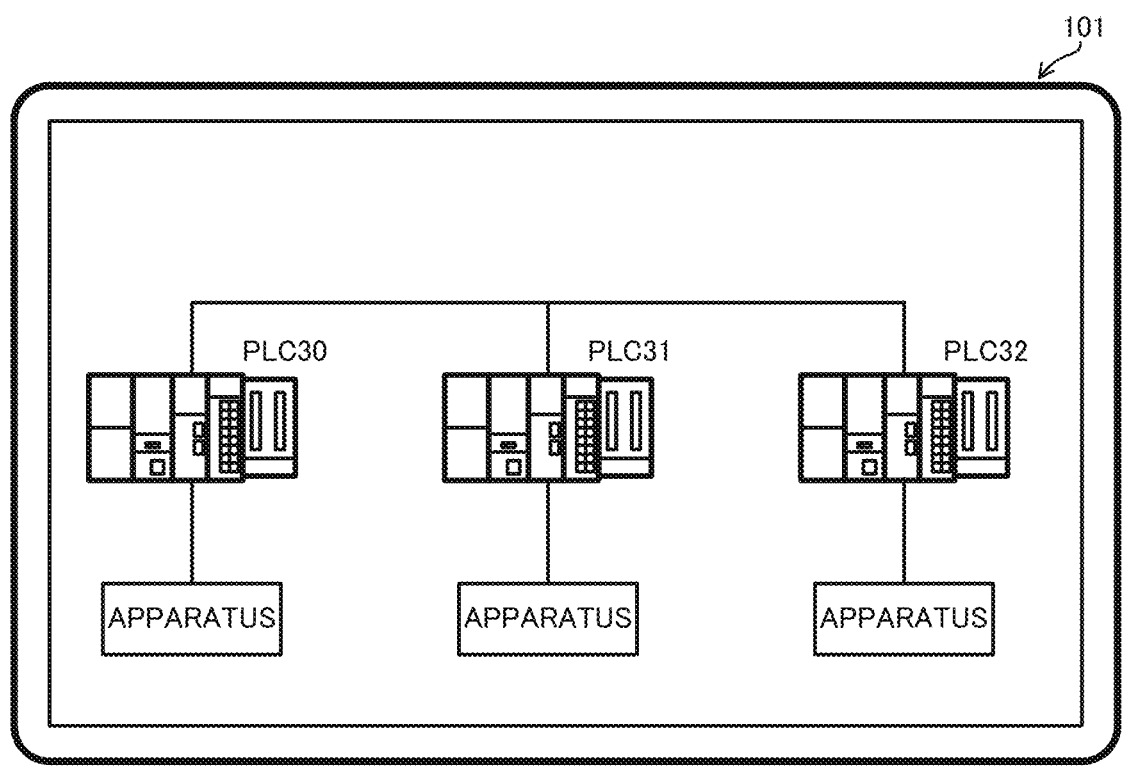
FIG. 2 is a first drawing illustrating one example of a monitoring screen according to the embodiment.

Here, concrete examples of the monitoring screen 101 are described with reference to FIGS. 2 to 4. FIG. 2 illustrates an example of the monitoring screen 101. The configuration of the control system 1000, together with the names of the control devices 30 included in the control system 1000, is displayed on this monitoring screen 101. When the user selects an image of one of the control devices 30 that is displayed on the monitoring screen 101, the monitoring screen 101 displays an image 50 of the selected control device 30, as illustrated in FIG. 3.

Figure 3:
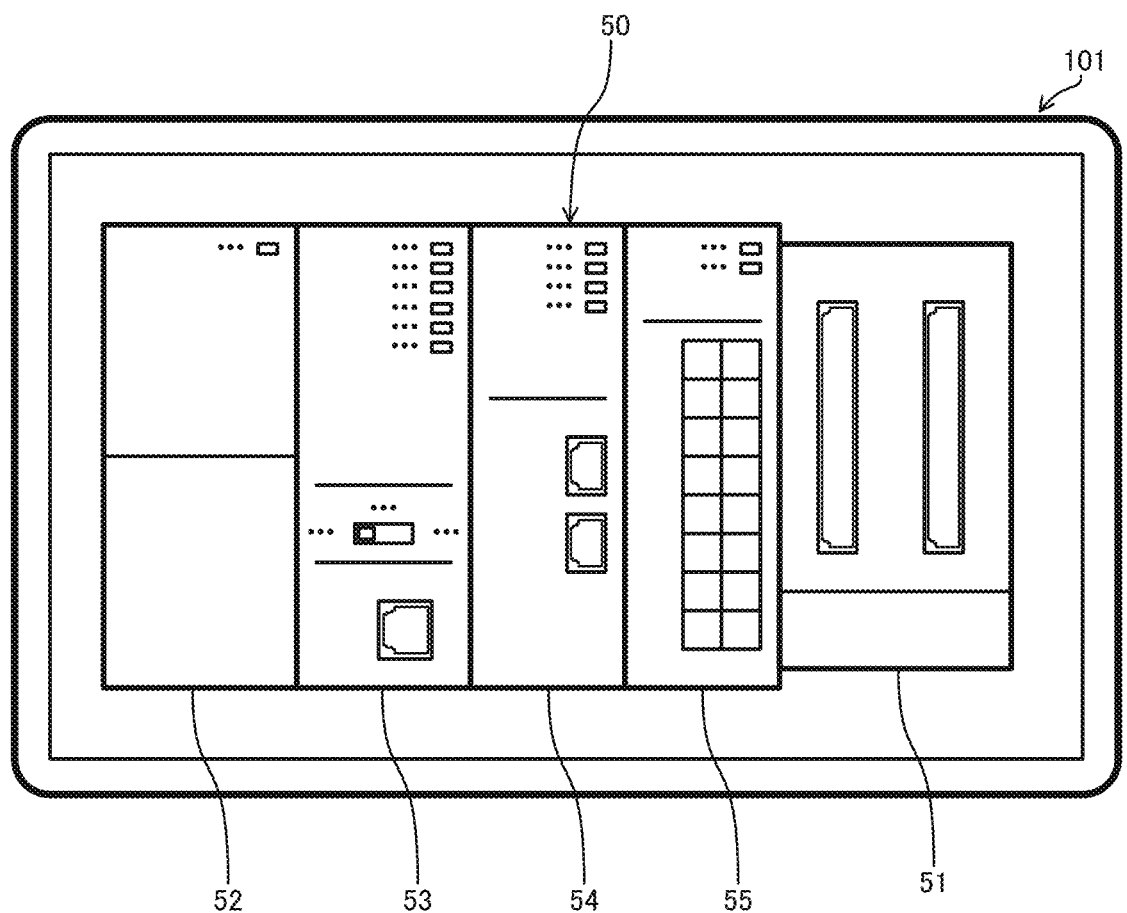
FIG. 3 is a second drawing illustrating one example of the monitoring screen according to the embodiment.

As illustrated in FIG. 3, each of the control devices 30 includes multiple units. Specifically, a power supply unit represented by an image 52, a central processing unit (CPU) represented by an image 53, a network unit represented by an image 54, and an analog unit represented by an image 55 are attached to a base unit represented by the image 51, thereby forming the control device 30. An image 50 representing actual external appearance of such a control device 30 is displayed on the monitoring screen 101.

Also, the operating state of the control devices 30 corresponds to operating states of the units included in the control devices 30. Accordingly, the image 50 illustrated in FIG. 3 may be displayed in conjunction with the actual state of each unit. Specifically, blinking or lighting of a light emitting diode (LED), the displayed content of a liquid crystal panel, and an input state of a switch of each unit may be displayed on the image 50 as equivalent to the actual state. However, when, for example, a portion corresponding to the LED is displayed in the external appearance illustrated in FIG. 3, displayed size of a portion to which the user is to pay attention may be small. Accordingly, the monitoring screen 101 displays the operating state of each unit such as illustrated in FIG. 4.

Figure 4:
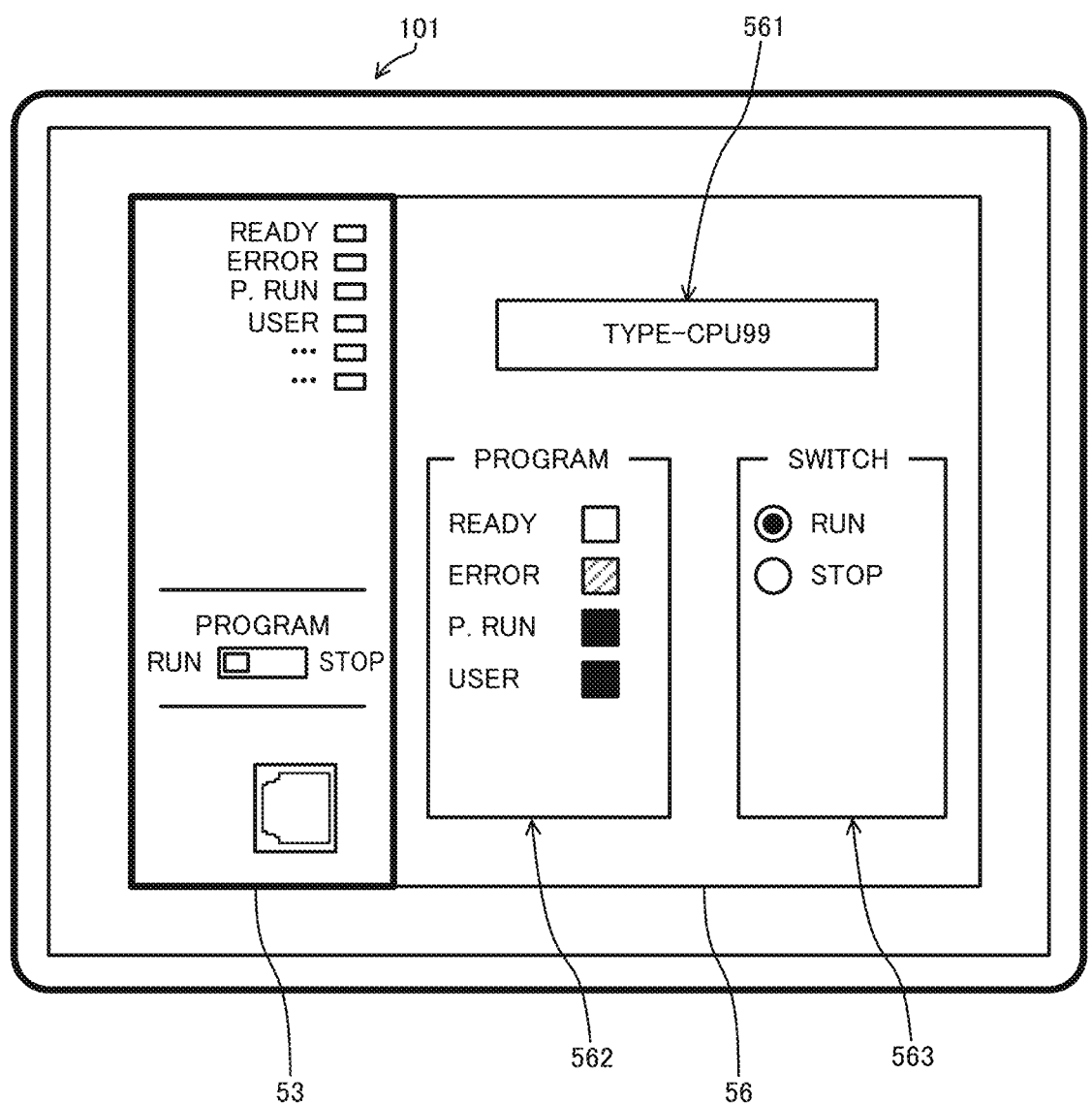
FIG. 4 is a third drawing illustrating one example of the monitoring screen according to the embodiment.

The monitoring screen 101 of FIG. 4 displays an operating state of the CPU. The monitoring screen 101 is displayed by selecting, by the user, the CPU corresponding to the image 53 in FIG. 3. The selection by the user is, for example, a click operation of a cursor located in a display area of the image 53 or a tap operation in the display area. The monitoring screen 101 displays (i) the image 53 representing the appearance of the CPU and (ii) a pane 56 indicating detailed information of the CPU. The pane 56 includes (i) a box 561 indicating a model name of the CPU, (ii) an area 562 indicating a state of the LED, and (iii) an area 563 indicating an input state of a hardware switch. In the area 562, a black-painted box indicates a lighting-off state, a white box indicates a lighting-on state, and a hatched box indicates a blinking state.

The server 20 and the generation device 10 cooperate with each other, thereby achieving displaying of the monitoring screen 101 in accordance with the configuration of the control device 30 and the model of the units as illustrated in FIGS. 2 to 4.

Hereinafter, hardware configurations of the generation device 10 and the server 20 are described with reference to FIG. 5. Each of the generation device 10 and the server 20 includes a processor 61, a main storage 62, an auxiliary storage 63, an inputter 64, an outputter 65, and a communicator 66 as hardware configuration thereof. All of the main storage 62, the auxiliary storage 63, the inputter 64, the outputter 65, and the communicator 66 are connected to the processor 61 via the internal bus 67.

The processor 61 includes a CPU element. The processor 61 achieves various types of functions of the generation device 10 and the server 20 by executing a program P1 stored in the auxiliary storage unit 63, and executes processing described later.

The main storage 62 includes a random access memory (RAM). The program P1 is loaded from the auxiliary storage 63 into the main storage 62. The main storage 62 is used as a work area of the processor 61.

The auxiliary storage 63 includes a non-volatile memory typified by an electrically erasable programmable read-only memory (EEPROM) and a hard disk drive (HDD). In addition to the program P1, the auxiliary storage 63 stores various data used for processing of the processor 61. The auxiliary storage 63 supplies, to the processor 61, the data to be used by the processor 61, and stores data supplied from the processor 61 in accordance with an instruction of the processor 61.

The inputter 64 includes an input device such as an input key and a pointing device. The inputter 64 acquires the information input by the user of the generation device 10 and the server 20, and notifies the processor 61 of the acquired information.

The outputter 65 includes an output device typified by a liquid crystal display (LCD) and a speaker. The outputter 65 presents various types of information to the user in accordance with the instruction of the processor 61.

The communicator 66 includes a network interface circuit for communicating with an external device. The communicator 66 receives a signal from the outside and outputs, to the processor 61, data indicated by this signal. Also, the communicator 66 transmits, to the external device, a signal indicating data output from the processor 61. In FIG. 5, one communicator 66 is illustrated as representative, without particular limitation. For example, the server 20 may separately include a communicator 66 connected to the generation device 10 and a communicator 66 connected to the control device 30.

Figure 5:
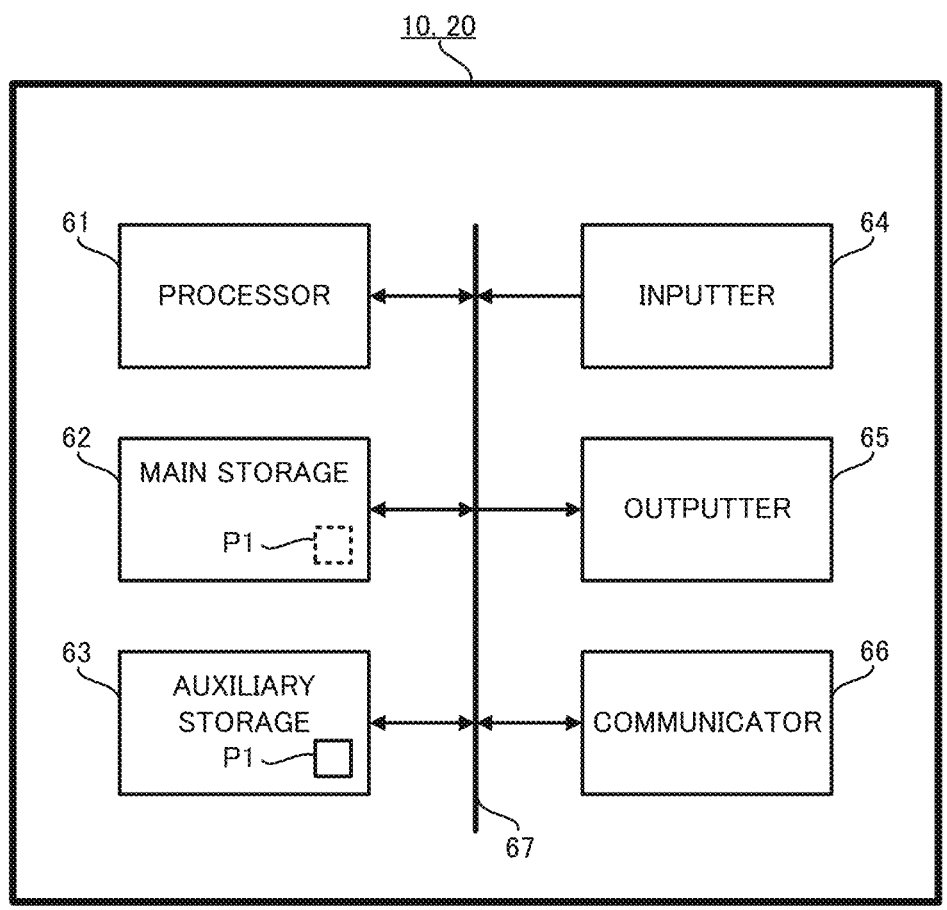
FIG. 5 is a drawing illustrating a configuration of hardware of a generation device and a server according to the embodiment.
Figure 6:
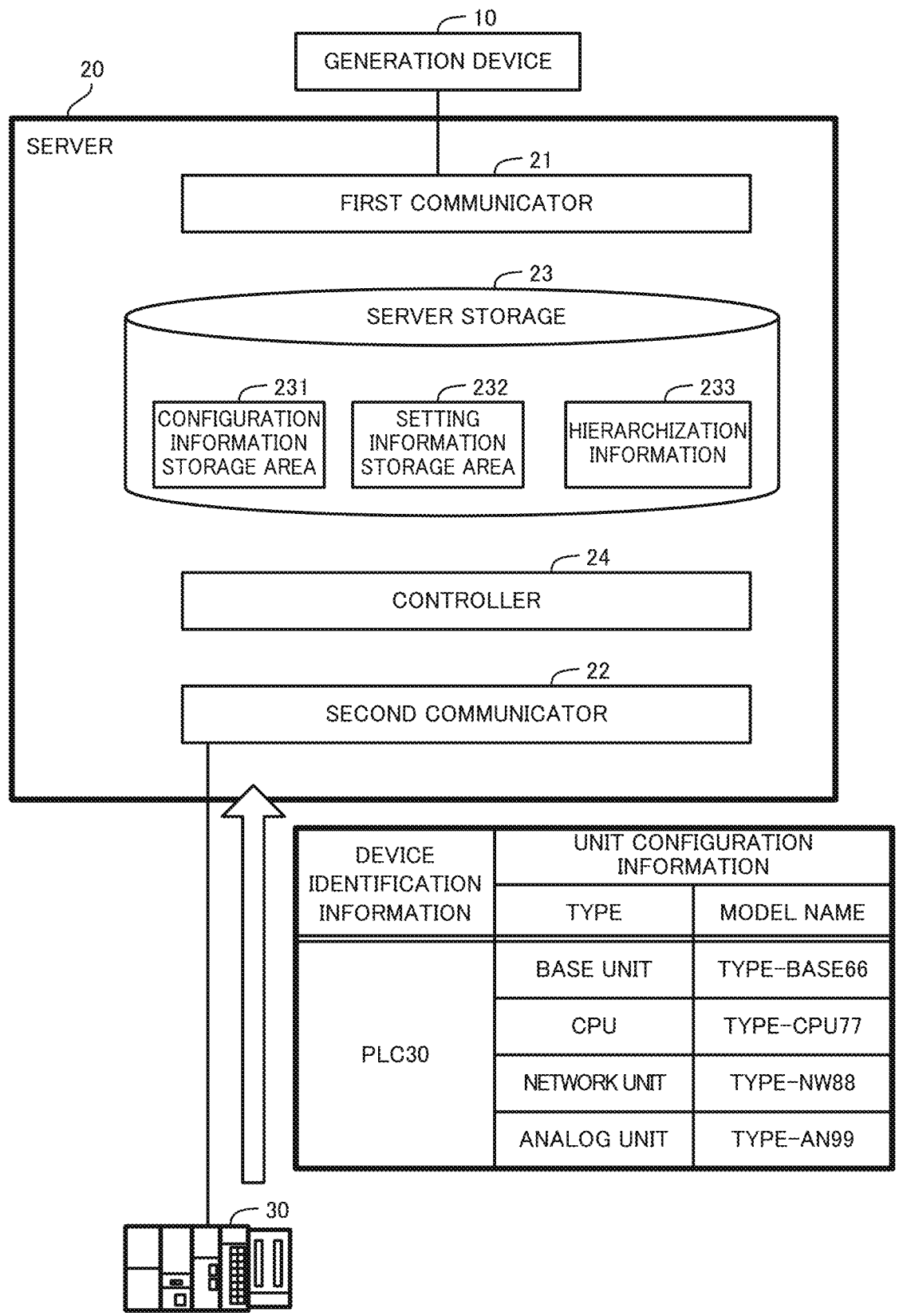
FIG. 6 is a drawing illustrating a functional configuration of the server according to the embodiment.

By cooperative action of the hardware configuration illustrated in FIG. 5, the generation device 10 and the server 20 exhibit various types of functions. Specifically, as illustrated in FIG. 6, the server 20 includes as functions thereof (i) a first communicator 21 for communicating with the generation device 10, (ii) a second communicator 22 for communicating with the control device 30, (iii) a server storage 23 that stores various types of data, and (iv) a controller 24 that controls the components of the server 20 to execute various processes.

The first communicator 21 is mainly achieved by the communicator 66 of the server 20. The first communicator 21 receives a request from the generation device 10 and notifies the controller 24 of the request. Also, the first communicator 21 acquires, from the controller 24, data indicating a response to the request from the generation device 10 and transmits the acquired data to the generation device 10.

The second communicator 22 is mainly achieved by the communicator 66 of the server 20. The second communicator 22 (i) transmits and receives data to and from the control devices 30 in accordance with the instruction of the controller 24 and (ii) relays communication between the controller 24 and the control devices 30.

The server storage 23 is mainly achieved by the auxiliary storage 63 of the server 20. The server storage 23 is one example of server storage means that stores multiple pieces of setting information described later and provides the setting information in accordance with the configurations of the control devices 30 in the screen data generating system 100. The server storage 23 manages data in accordance with, for example, OPC UA. The data managed by the server storage 23 includes information for generating the monitoring screen 101.

The controller 24 is mainly achieved by the processor 61 of the server 20. The controller 24 (i) acquires, from the control devices 30 via the second communicator 22, device identification information relating to the control devices 30 and unit configuration information relating to the units included in the control devices 30 and (ii) stores the acquired information in a configuration information storage area 231 of the server storage 23.

The device identification information is, for example, discrimination information for distinguishing the control devices 30 from another control device 30. The device identification information may be a device name set by the user, a device name generated by each of the control devices 30 itself, or an address of each of the control devices 30. Also, the unit configuration information is information for specifying the units, for example, information for identifying at least one of the type of each unit included in the control device 30 or the model name of each unit. If the type or model name of the unit is clarified, the data for displaying the operating state of the unit on the monitoring screen 101 can be identified. Accordingly, such unit configuration information is used. FIG. 6 illustrates an example in which the server 20 acquires unit configuration information of four units included in a control device 30 named "PLC30". The unit configuration information may include unit identification information different from the type and model name for distinguishing the unit from other units.

Also, the controller 24 refers to a setting information storage area 232 previously stored in the server storage 23, and reads the setting information corresponding to the unit configuration information acquired from the control devices 30. FIG. 7 illustrates an example of the data stored in the setting information storage area 232. As illustrated in FIG. 7, the setting information storage area 232 is stored in association with the unit configuration information relating to various types of units that can be included in the control devices 30 and setting information indicating a setting for displaying the operating states of the units.

The setting information indicates a tag name indicating the operating state of the unit and an address that is a storage area of the unit in which the data indicating the operating state is stored, in association with each other. The address is also referred to as a device address. The tag name corresponds to a label of the operating state and is used for the server 20 to identify the operating state sent as notification to the generation device 10. For example, in FIG. 7, an operating state indicated by a label "READY" of a CPU whose model name is "TYPE-CPU77" is indicated by a data value of an address "D100" of the CPU. When the generation device 10 requests an operating state of a tag name "READY", the server 20 obtains the operating state of the unit by accessing the device address related to the tag name.

Data corresponding to the unit configuration information of FIG. 6 is indicated by arrows in FIG. 7. The controller 24 reads the data from the setting information storage area 232 and combines with the read data the acquired device identification information and the unit configuration information, thereby generating hierarchization information 233 in which the device identification information, the unit configuration information, and the setting information are hierarchized in that order. Next, the controller 24 stores the generated hierarchization information 233 in the server storage 23. The hierarchization information 233 is read from the server storage 23 by the controller 24 in response to a request from the generation device 10, and then is provided to the generation device 10.

FIG. 8 illustrates one example of the hierarchization information 233. As illustrated in FIG. 8, the hierarchization information 233 includes information that is hierarchized as (i) a first hierarchy to which the device identification information belongs, (ii) a second hierarchy to which the unit configuration information belongs, and (iii) a third hierarchy to which the setting information of each unit belongs. Although the configuration information storage area 231 and the hierarchization information 233 are illustrated separately in FIG. 6, the hierarchization information 233 may be stored in the configuration information storage area 231.

Figure 9:
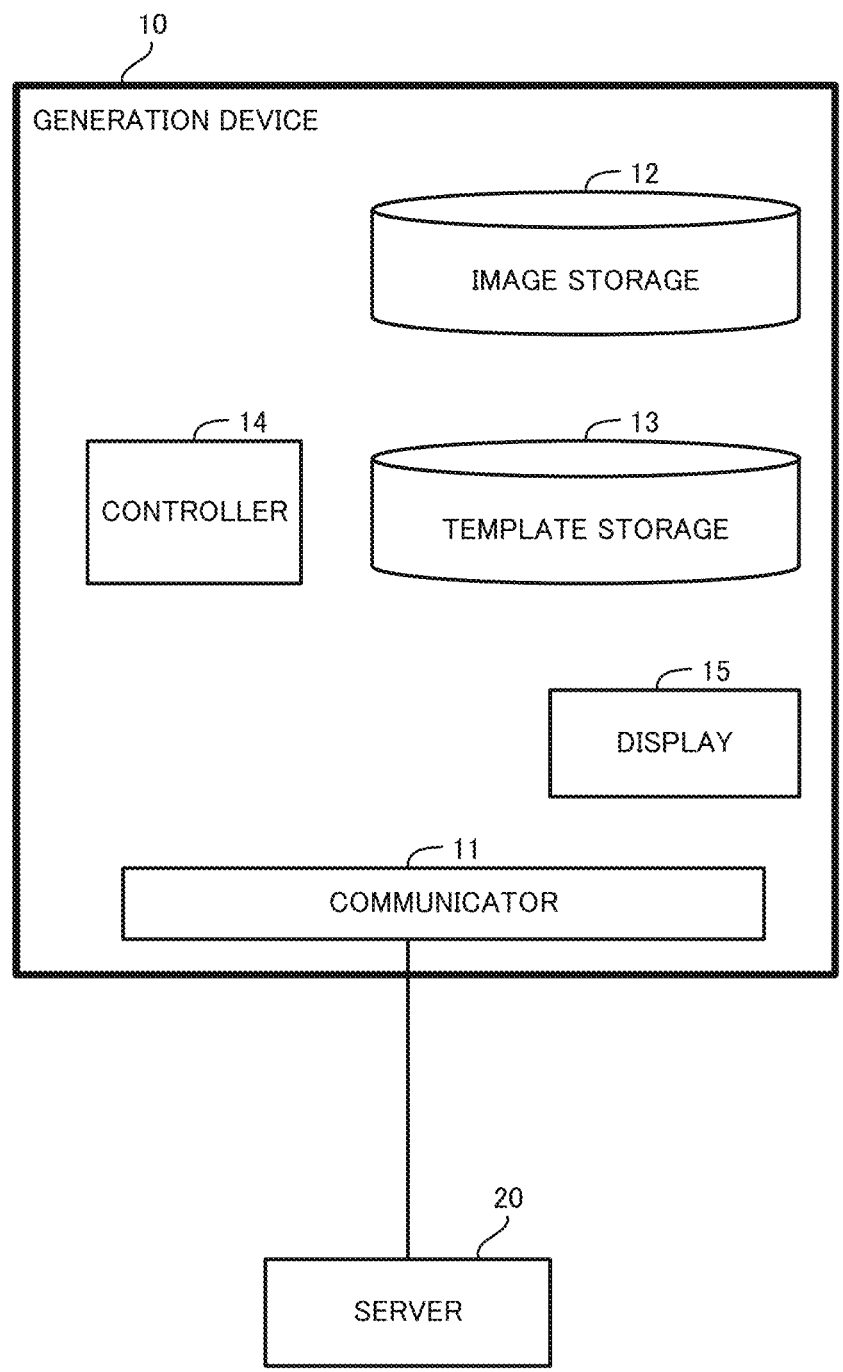
FIG. 9 is a drawing illustrating a functional configuration of the generation device according to the embodiment.

Next, functional configuration of the generation device 10 is described. The generation device 10 acquires the hierarchization information 233 managed by the server 20, thereby preparing a template for the monitoring screen 101. As illustrated in FIG. 9, the generation device 10 includes (i) a communicator 11 for communicating with the server 20, (ii) an image storage 12 that previously stores an image that is a screen component as a material for preparing the template, (iii) a template storage 13 that stores the prepared template, (iv) a controller 14 that controls a component of the generation device 10 to generate screen data of the monitoring screen 101 from the template, and (v) a display 15 that displays the monitoring screen 101.

The communicator 11 is mainly achieved by the communicator 66 of the generation device 10. The communicator 11 transmits and receives data to and from the server 20 in accordance with an instruction of the controller 14, and relays the communication between the controller 14 and the server 20.

The image storage 12 and the template storage 13 are DBMSs that are mainly achieved by the auxiliary storage 63 of the generation device 10. The image storage 12 is one example of image storage means of the screen data generating system 100 for storing a unit image, which is an image of the unit. Also, the template storage 13 is one example of template storage means of the screen data generating system 100 for storing a template of screen data. Details of the data managed by the image storage 12 and the template storage 13 are described later.

Figure 10:
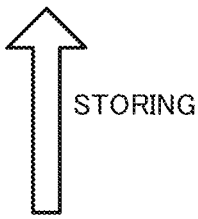
FIG. 10 is a drawing illustrating an example of a template according to the embodiment.

The controller 14 is mainly achieved by the processor 61 of the generation device 10. The controller 14 requests the server 20 to provide the hierarchization information 233, thereby acquiring the hierarchization information 233 transmitted from the server 20. Next, as illustrated in FIG. 10, the controller 14 prepares a template including, respectively as a configuration property and a model name property, the type and model name indicated by the unit configuration information in the hierarchization information, and stores the prepared template in the template storage 13.

Figure 11:
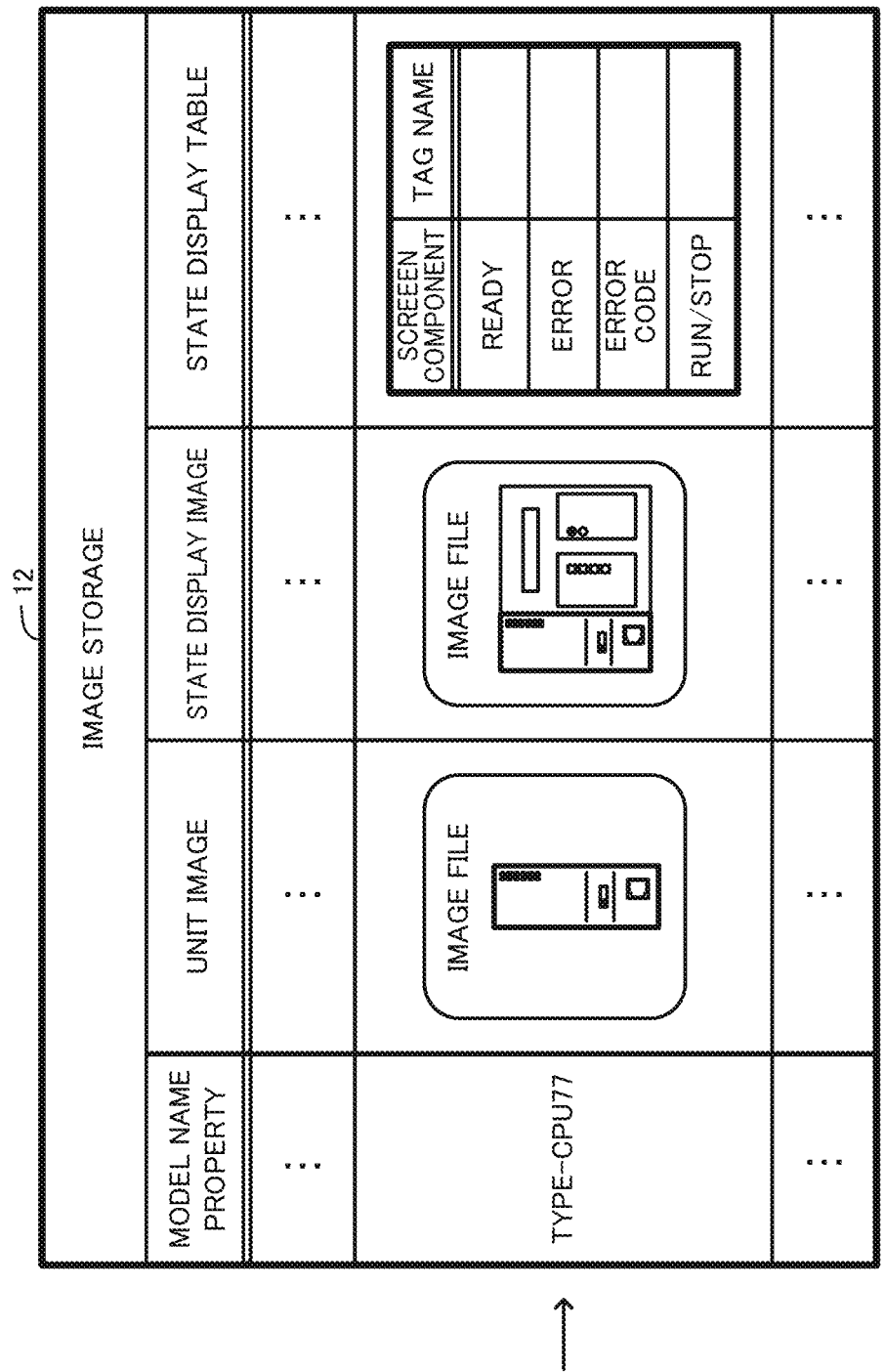
FIG. 11 is a drawing illustrating information stored in an image storage according to the embodiment.

Also, the controller 14 refers to the image storage 12 and reads the data corresponding to the unit configuration information. As illustrated in FIG. 11, the image storage 12 stores, for each unit, data associated with (i) a model name property, (ii) a unit image representing the appearance of the unit, (iii) a state display image serving as a base for displaying an operating state of the unit, and (iv) a state display table that indicates details for displaying the operating state on the state display image. The unit image is used for displaying the monitoring screen 101 illustrated in FIGS. 2 and 3, and the state display image is used for displaying the monitoring screen 101 illustrated in FIG. 4.

The controller 14 reads, from the image storage 12, the unit image, the state display image and the state display table that correspond to the model name property of the template. Next, the controller 14 stores, in the template, the location information that indicates a location of the unit image corresponding to each unit in the image storage 12. Specifically, as illustrated in FIG. 10, the controller 14 stores, in the template, a path of the unit image as a unit file property in association with the configuration property and the model name property.

Figure 12:
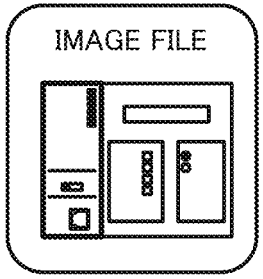
FIG. 12 is a drawing illustrating detailed information according to the embodiment.

Additionally, the controller 14 stores, as detailed information and in the template, the state display image and the state display table corresponding to each unit, together with the path in association with the configuration property and the model name property. FIG. 12 illustrates a concrete example of the detailed information. As illustrated in FIG. 12, the detailed information includes (i) an image file illustrating the state display image and (ii) a state display table read from the image storage 12.

Here, the state display table is table data that associates an object name of a screen component that displays the operating state with the tag name for acquiring the operating state from the server 20. The object name of the screen component is previously set. A value equal to the tag name in the hierarchization information 233 is assigned to the tag name by the controller 14. The controller 14 prepares the template in the above-described manner.

Next, the controller 14 generates screen data from the prepared template and transmits the generated screen data to the display 15, thereby causing display of the monitoring screen 101 on the display 15. Afterward, the controller 14 updates the display content of the monitoring screen 101 by using the data that indicates the operating state and that is acquired from the server 20 in real time.

The display 15 is mainly achieved by the outputter 65 of the generation device 10. Specifically, the display 15 displays, on the screen and in accordance with the instruction of the controller 14, the information provided by the controller 14.

Next, processing executed by the screen data generating system 100 is described.

Figure 13:
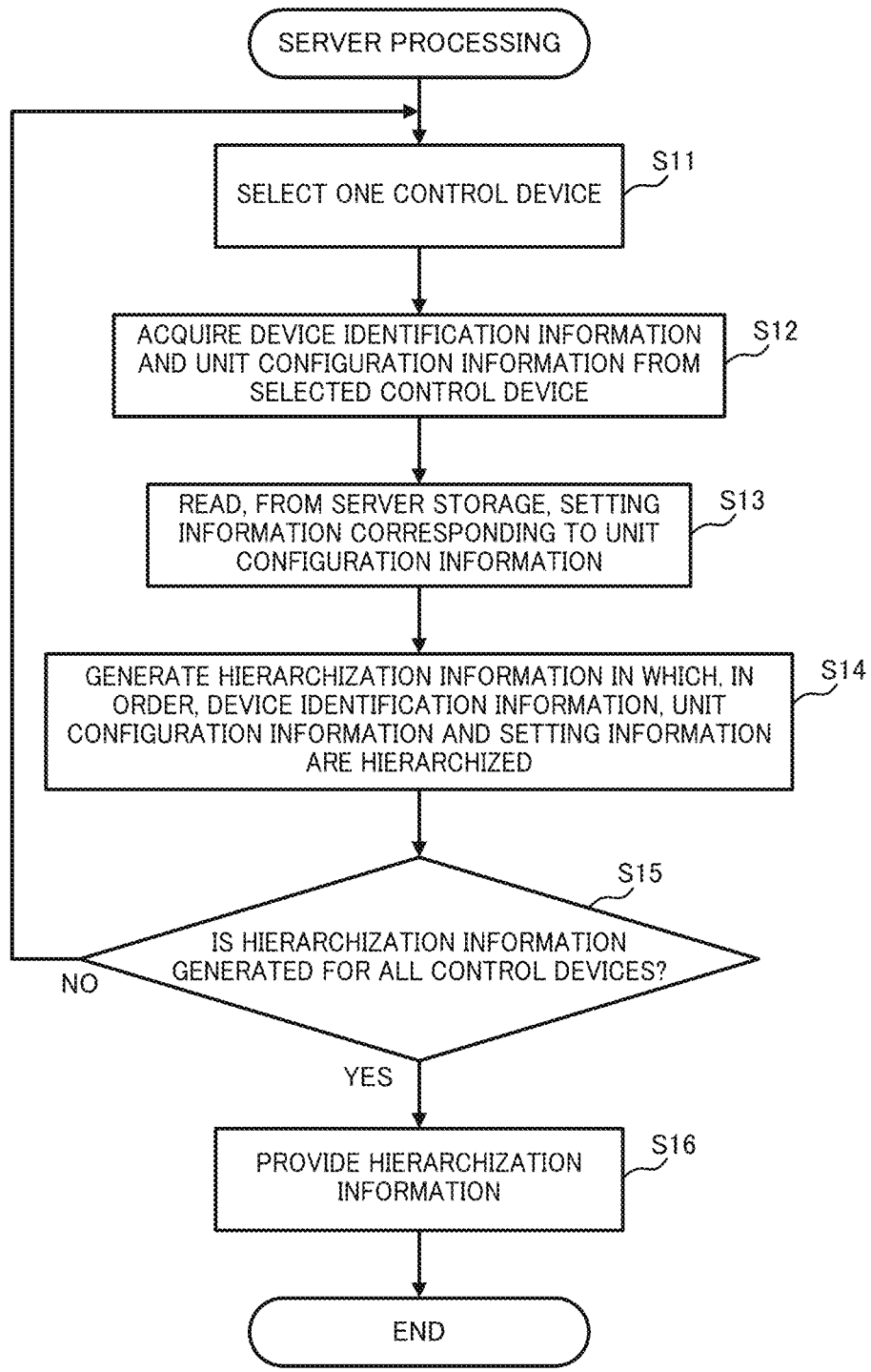
FIG. 13 is a flowchart illustrating server processing according to the embodiment.

FIG. 13 illustrates server processing executed by the server 20. This server processing is started by executing a specific program of the server 20.

In the server processing, the server 20 selects one unselected control device from connected control devices 30 (step S11). Specifically, the controller 24 selects, in predetermined order, one control device 30 from one or more control devices 30 capable of communicating with the server 20. The predetermined order may be, for example, order of establishment of communication or ascending order regarding values of communication addresses.

Next, the server 20 acquires the device identification information and the unit configuration information from the selected control device 30 (step S12). Specifically, the controller 24 acquires the notification information by requesting the control device 30 to send notification of the device identification information and the unit configuration information via the second communicator 22. Next, the controller 24 stores the acquired information in the configuration information storage area 231 of the server storage 23.

Next, the server 20 reads, from the server storage 23, the setting information corresponding to the unit configuration information (step S13). Specifically, the controller 24 finds and reads, from the setting information storage area 232 of the server storage 23, the setting information corresponding to the same values as the type and the model name of the unit configuration information acquired in step S12. As a result, the setting information relating to each of the units included in the control device 30 selected in step S11 is read.

Next, the server 20 generates the hierarchization information 233 in which the device identification information, the unit configuration information, and the setting information are hierarchized in that order (step S14). Specifically, the controller 24 associates the device identification information and the unit configuration information that are acquired in step S12 with the setting information read in step S13, thereby generating the hierarchization information 233 as a block of structured data. Next, the controller 24 stores the generated hierarchization information 233 in the server storage 23.

Next, the server 20 determines whether the hierarchization information 233 is generated for all the control devices 30 (step S15). Specifically, the controller 24 determines whether the hierarchization information 233 for all the control devices 30 connected and communication-capable with the server 20 is stored in the server storage 23.

When the server 20 determines that the hierarchization information 233 is not generated for all the control devices 30 (No in step S15), the server 20 repeats the processes of step S11 and beyond. As a result, the hierarchization information 233 is generated, in order, for unselected control devices 30 and is stored in the server storage 23. On the other hand, when the server 20 determines that the hierarchization information 233 is generated for all the control devices 30 (Yes in step S15), the server 20 provides the hierarchization information 233 in response to the external request (step S16). Specifically, the controller 24 reads the hierarchization information 233 from the server storage 23 in response to a request from the generation device 10 and provides the read information. Afterward, the server processing ends.

Figure 14:
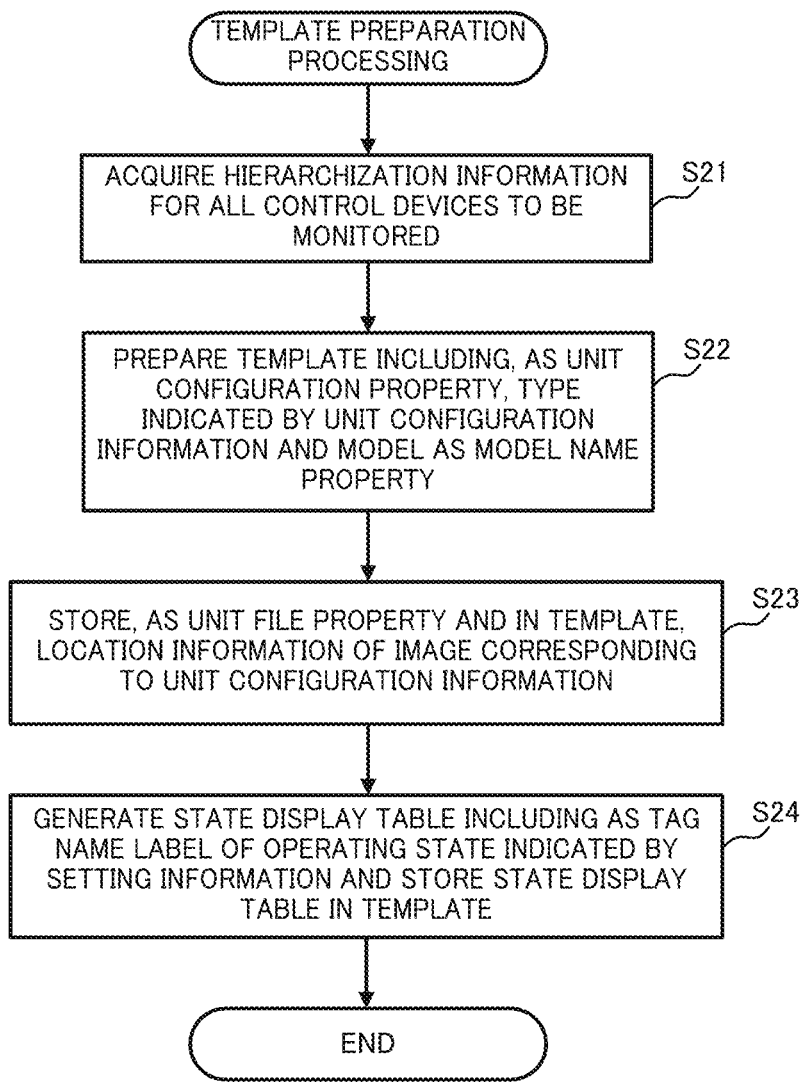
FIG. 14 is a flowchart illustrating template preparation processing according to the embodiment.

Template preparation processing executed by the generation device 10 is described next with reference to FIG. 14. This template preparation processing is started by executing a specific program of the generation device 10.

In the template preparation processing, the generation device 10 acquires the hierarchization information 233 for all of control devices 30 serving as subject of monitored (step S21). Specifically, the controller 14 acquires the hierarchization information 233 by requesting the server 20 to provide the hierarchization information 233 relating to one or more control devices 30. The control devices 30 to be monitored may be all of control devices 30 connected to the server 20, control devices 30 selected by the user or control devices 30 satisfying a condition previously preset in the generation device 10. The preset condition may be, for example, a condition that the user can perform monitoring by access authority previously given to the user.

Next, the generation device 10 prepares, for each control device 30, a template that includes (i) a type indicated by the unit configuration information as the unit configuration property and (ii) a model indicated by the unit configuration information as the model name property (step S22). Specifically, the controller 14 generates data of a template including a value equal to the unit configuration information in the hierarchization information 233 acquired in step S21.

Next, for all the units of each control device 30, the generation device 10 stores, as a unit file property and in the template, the location information of the unit image corresponding to the unit configuration information (step S23). Specifically, the controller 14 (i) searches the image storage 12 for a unit image corresponding to the unit configuration information in the hierarchization information 233 acquired in step S21 and (ii) stores, in the template prepared in step S22, a path of this unit image in the image storage unit 12.

Next, for all the units of each control device 30, the generation device 10 (i) generates the state display table including, as a tag name, a label of an operating state indicated by the setting information and (ii) stores the generated table in the template (step S24). Specifically, the controller 14 (i) generates the state display table including a value equal to the tag name included in the setting information in the hierarchization information 233 acquired in step S21 and (ii) stores the generated state display table in the detailed information of the template prepared in step S22. As a result, templates for generating screen data used for displaying the monitoring screen 101 on the display 15 are completed for all the control devices 30.

Figure 15:
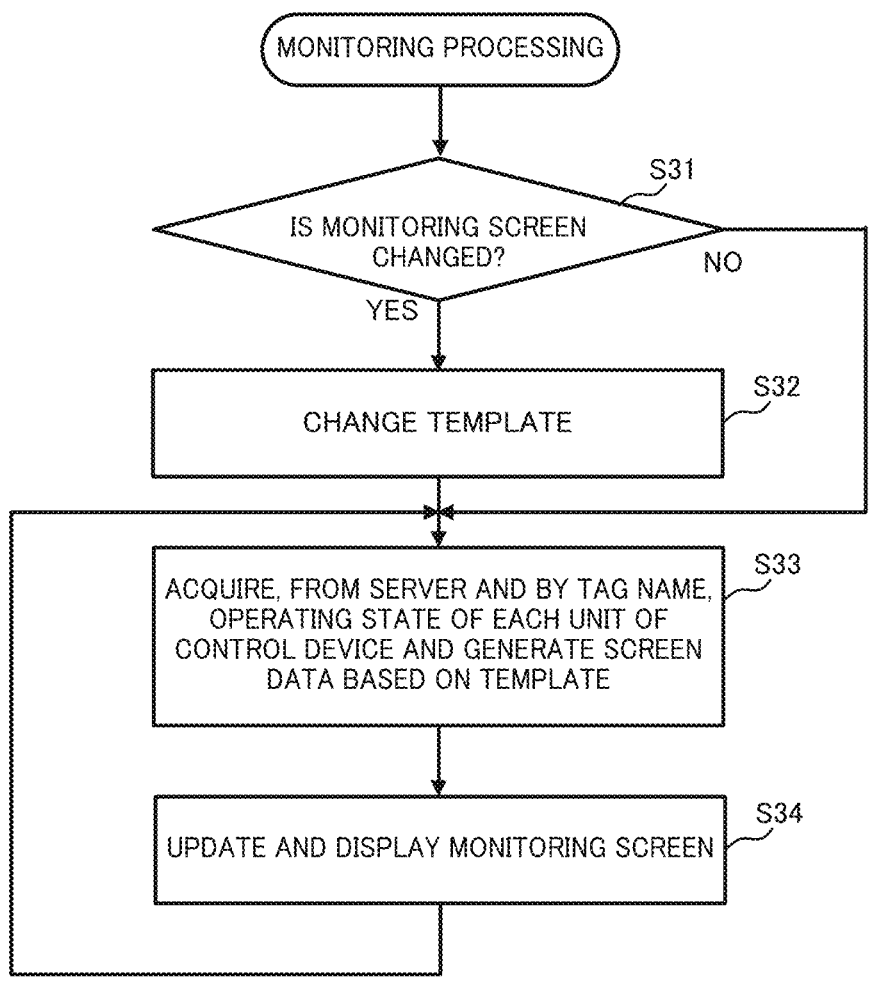
FIG. 15 is a flowchart illustrating monitoring processing according to the embodiment.

Monitoring processing executed by the generation device 10 is next described with reference to FIG. 15. The monitoring processing starts by executing a specific program of the generation device 10 after the completion of the template preparation processing.

In the monitoring processing, the generation device 10 determines whether the monitoring screen 101 is changed (step S31). Specifically, the controller 14 determines whether the user previously inputs a change instruction to change the monitoring screen 101.

When the generation device 10 determines that the monitoring screen 101 is not changed (No in step S31), the processing by the generation device 10 proceeds to step S33. On the other hand, when the generation device 10 determines that the monitoring screen 101 is changed (Yes in step S31), the generation device 10 changes the monitoring screen 101 in accordance with the change instruction. Specifically, the controller 14 changes the template in accordance with the change instruction (step S32). The change instruction may include, for example, (i) a change of arrangement of screen components and (ii) addition and deletion of a screen component.

Next, the generation device 10 (i) acquires, from the server 20 and by the tag name, an operating state of the control device 30 serving as the subject of monitoring and (ii) generates the screen data based on the template (step S33). Specifically, the controller 14 queries the server 20 as to the operating state identified by the tag name. Since the server 20 acquires the operating state of each of the control devices 30 in real time, the generation device 10 can acquire the operating states of the control devices 30 from the server 20.

Next, the generation device 10 transmits the screen data to the display 15, thereby updating and displaying the monitoring screen 101 (step S34). Afterward, the processing by the generation device 10 repeats the processes after step S33. As a result, the display content of the monitoring screen 101 is updated.

Figure 16:
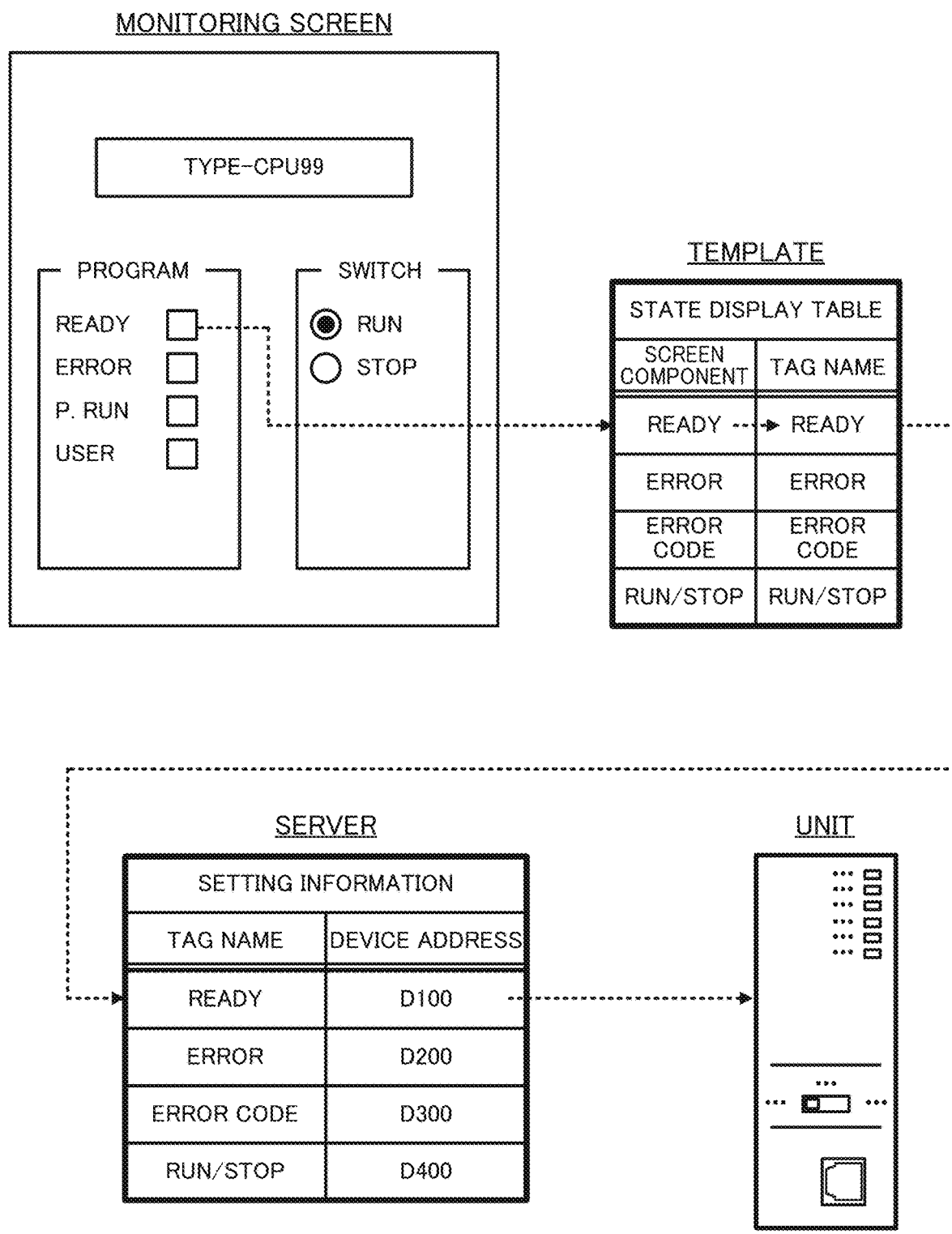
FIG. 16 is a drawing illustrating a relationship between the monitoring screen and a unit according to the embodiment.

In the above-described manner, as illustrated in FIG. 16, the relevance of the screen components of the monitoring screen 101 to the data of each unit becomes clear via the state display table of the template and the information managed by the server 20. Additionally, such relevance is defined using the hierarchization information 233 as illustrated in FIG. 8.

As described above, the server 20 acquires, from the control devices 30, the device identification information and the unit configuration information, and the generation device 10 thus generates, from the template including the unit configuration information, the screen data relating to the control devices 30 indicated by the device identification information. Accordingly, the work of creating the monitoring screen 101 can be drastically simplified. As a result, the workload of preparing the monitoring screen 101 can be reduced. Specifically, engineering man-hours for creating the monitoring screen 101 can be reduced, and the engineering cost at the time of system integration can be reduced.

Also, in a case in which the configuration of the control system 1000 is changed, the monitoring screen 101 is also to be changed. However, if the template is regenerated, the monitoring screen 101 is changed in accordance with the configuration of the control system 1000. Accordingly, work of redesigning the monitoring screen 101 becomes unnecessary. As a result, expansion of the control system 1000 becomes easy.

Also, the data relating to the control devices 30 is provided as the structured hierarchization information 233. Accordingly, data management between the generation device 10 and the server 20 becomes easy. Also, even when the monitoring screen 101 is changed, there is no need for an operator himself/herself to pay attention to the relationship between (i) the screen components for monitoring states of the units and (ii) the configurations of the control devices 30, and the operator can easily perform the work. For example, the device address is managed, by the server 20, together with the tag name, and the tag name is managed, by the generation device 10, together with the names of the screen components. Accordingly, there is no need for the operator to grasp the device address and the tag name, and the operator has only to simply give an instruction to change a screen component as an object to be changed.

Also, the generation device 10 generates the screen data by combining the setting information with the template including the unit configuration information in the hierarchization information 233. Specifically, as illustrated in FIG. 10, after adding, to the template including the type and model name of the unit on the basis of the setting information, a state display table including the tag name illustrated in FIG. 12, the generation device 10 generates the screen data from this template. As a result, the generation device 10 is capable of display of various types of information on the monitoring screen 101 by using the setting information previously stored in the server 20 together with the information transmitted from the control devices 30.

Also, the setting information includes (i) the label of the operating state of the unit and (ii) the address of the unit indicating the area in which the data indicating the operating state is stored. Next, the generation device 10 applies, to the tag name in the state display table, the label in the setting information. As a result, the generation device 10 can acquire the operating state of the unit by using the label without managing the device address.

Also, the server 20 previously stores multiple pieces of the setting information, selects the setting information corresponding to the unit configuration information transmitted from the control devices 30, and generates the hierarchization information 233. Accordingly, the server 20 can generate the hierarchization information 233 from the setting information corresponding to various units that each of the control devices 30 can include.

Also, the generation device 10 (i) stores the unit image that is an image representing the appearance of each unit and (ii) generates the screen data from the template including the path of the unit image. Accordingly, the appearance of the unit is displayed on the monitoring screen 101 based on the screen data. Thus, the user who visually confirms the monitoring screen 101 can visually confirm, on the monitoring screen 101, an image having the same configuration as the actual external appearance of each of the control devices 30. As a result, a control device 30 whose state is displayed on the monitoring screen 101 can be easily associated with a housing of an actual control device 30.

Although the embodiment of the present disclosure is described above, the present disclosure is not limited to the above-described embodiment.

Figure 17:
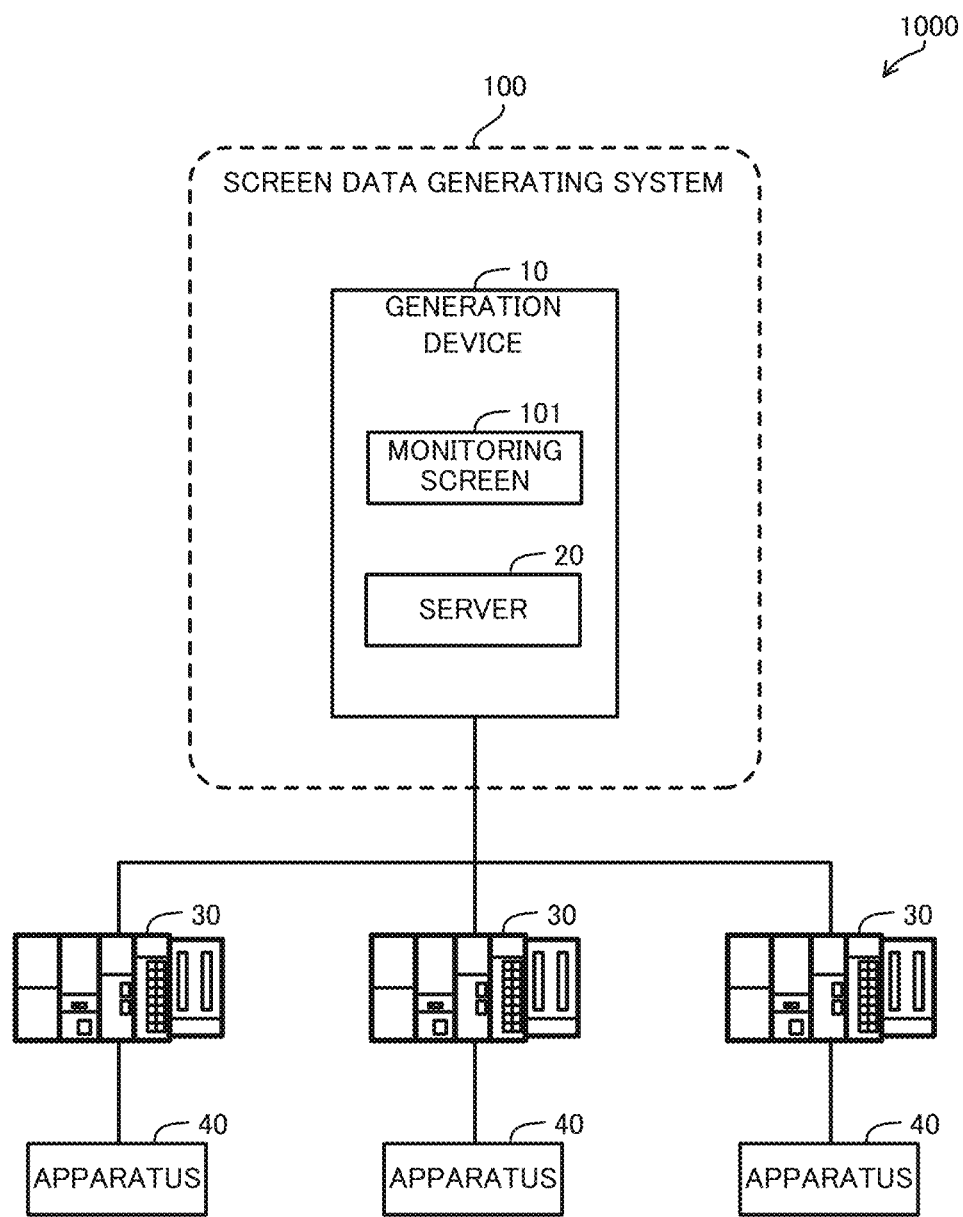
FIG. 17 is a drawing illustrating a screen data generating system according to a modified example.

For example, an example in which the generation device 10 and the server 20 are devices separate from each other is described above, without particular limitation. As illustrated in FIG. 17, the generation device 10 may have the function of the server 20 achieved by software.

Figure 18:
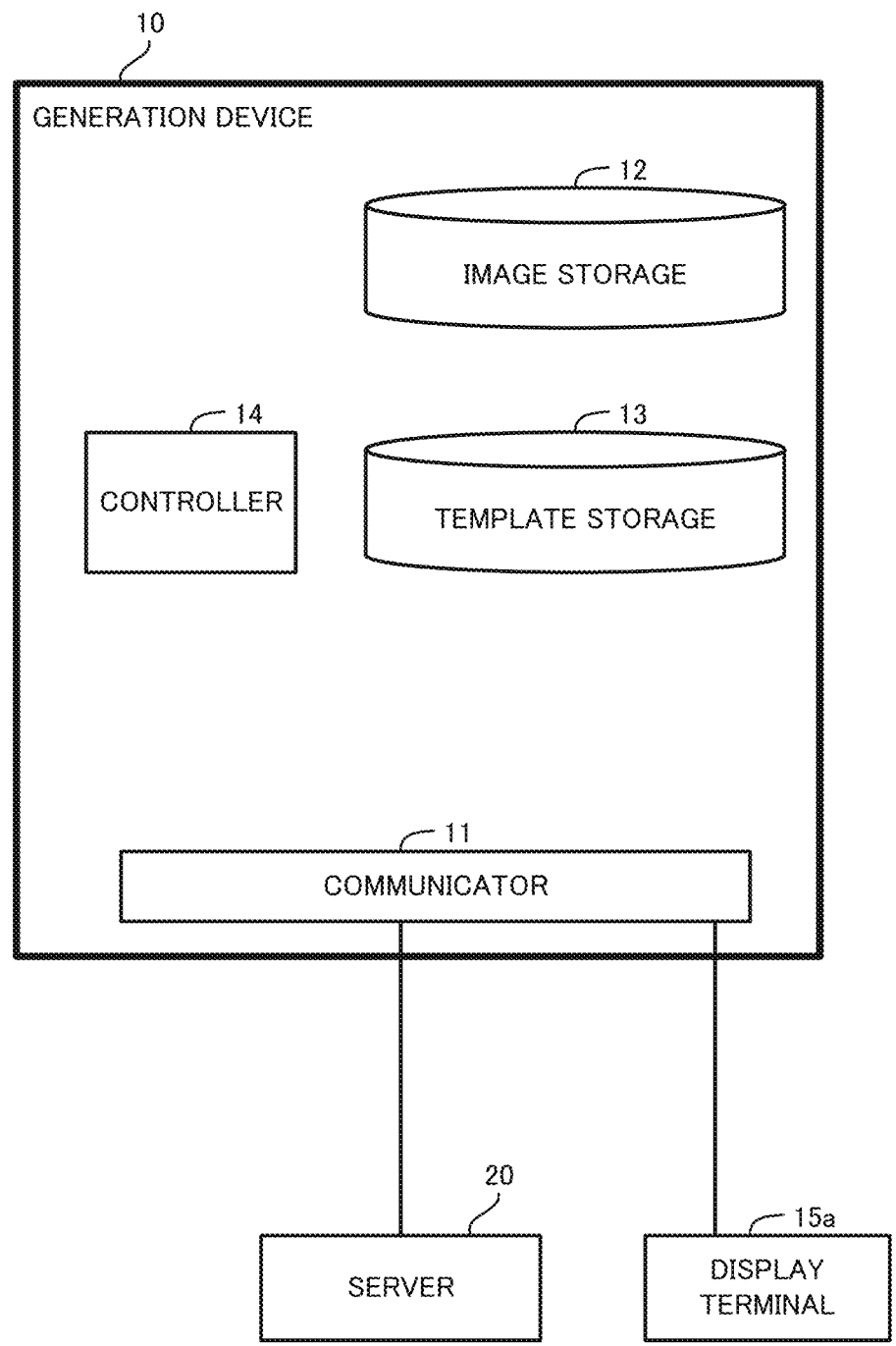
FIG. 18 is a drawing illustrating a generation device according to the modified example.

Also, an example in which the generation device 10 itself displays the monitoring screen 101 is described above, without particular limitation. As illustrated in FIG. 18, the generation device 10 may display the monitoring screen 101 by transmitting screen data to an external display terminal 15*a*.

Figure 19:
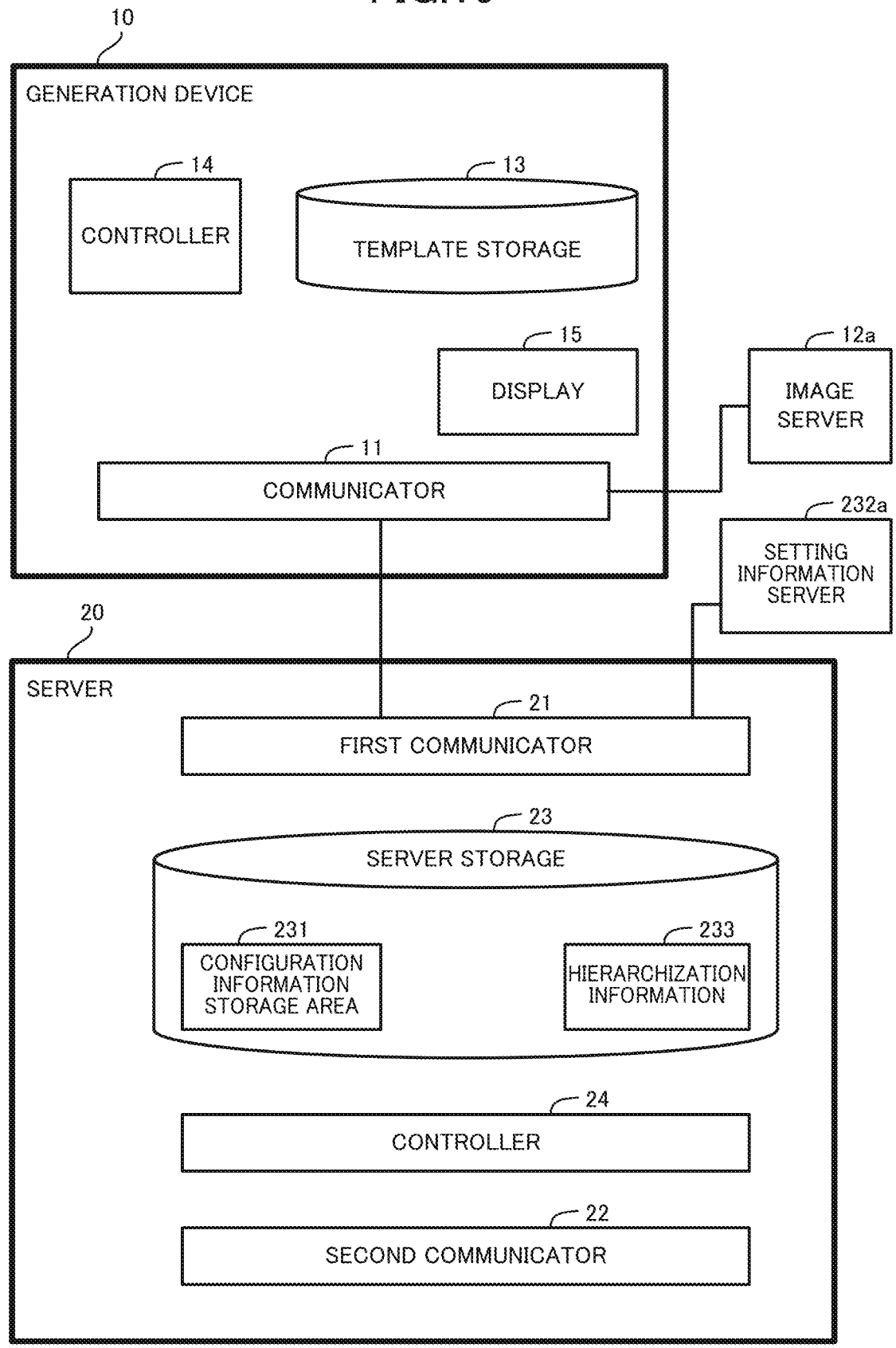
FIG. 19 is a drawing illustrating a control system according to the modified example.

Also, the image storage 12 may be omitted in configuration of the generation device 10, and the setting information storage area 232 of the server storage 23 may be omitted in configuration of the server 20. As illustrated in FIG. 19, the generation device 10 may acquire necessary information from an external image server 12*a* that stores data similar to that stored in the image storage 12, and the server 20 may acquire necessary information from an external setting information server 232*a* that stores the information similar to that stored in the setting information storage area 232.

Also, an example in which the generation device 10 prepares the template is described above, without particular limitation. Multiple templates including different types and different model names may be previously stored in the template storage means. Additionally, the generation device 10 may (i) select a template corresponding to the unit configuration information included in the hierarchization information 233 acquired from the server 20 and (ii) apply the setting information to the selected template, thereby changing to a state in which the template can be used in the monitoring processing.

Also, regarding the setting information provided from the server 20 to the generation device 10, the device address included in the setting information may be omitted. Also, the setting information may include other information different from the label and the device address of the operating state.

Also, the functions of the generation device 10 and the server 20 can be achieved by dedicated hardware or by a normal computer system.

For example, the program P1 executed by the processor 61 is stored in a non-transitory computer readable recording medium, the recording medium storing the program P1 is distributed, and then the program P1 is installed in a computer, thereby enabling production of a device for executing the above-described processing. Conceivable examples of such a recording medium include a compact disc-read only memory (CD-ROM), a digital versatile disc (DVD), and a magneto-optical disk (MO).

Alternatively, the program P1 may be previously stored in a disk device that is included in a server device on a communication network typified by the Internet, and the program P1 may be downloaded onto the computer, for example, by superimposing the program P1 on a carrier wave.

Also, the above-described processing can be achieved by launching and executing the program P1 while transferring the program P1 via the communication network.

Additionally, the above-described processing can be also achieved by (i) executing the whole of or a part of the program P1 on the server device and (ii) executing the program while the computer is transmitting and receiving information relating to the processing via the communication network.

Also, in a case in which the above-described functions are achieved by divvying between operating systems (OS) or in cooperation between an OS and an application program, storage of only a portion other than the OS in the recording medium is permissible, and such a recording medium may be distributed or the portion other than the OSs may be downloaded onto the computer.

Also, means for achieving the functions of the generation device 10 and the server 20 is not limited to software, and a part or the whole of the functions may be achieved by dedicated hardware including a circuit.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure is suitable for monitoring an operating state of a system.

REFERENCE SIGNS LIST

1000 Control system
100 Screen data generating system
101 Monitoring screen
10 Generation device
11 Communicator
12 Image storage
12a Image server
13 Template storage
14 Controller
15 Display
15a Display terminal
20 Server
21 First communicator
22 Second communicator
23 Server storage
231 Configuration information storage area
232 Setting information storage area
232a Setting information server
233 Hierarchization information
24 Controller
30 Control device
40 Apparatus
50-55 Image
56 Pane
61 Processor
62 Main storage
63 Auxiliary storage
64 Inputter
65 Outputter
66 Communicator
67 Internal bus
561 Box
562, 563 Area
P1 Program

The invention claimed is:

1. A screen data generating system comprising:
a generation device to generate screen data for displaying a monitoring screen used for monitoring an operating state of a control device that controls an apparatus without managing a device address associated with the control device; and
a server including a server storage to store setting information that indicates a setting for displaying, on the monitoring screen, an operating state of a unit included in the control device, the server being configured to acquire, from the control device, device identification information for identifying the control device and unit configuration information relating to the unit and to generate and provide hierarchization information in which the acquired device identification information, the acquired unit configuration information, and the setting information are hierarchized in order of the acquired device identification information as a first hierarchy, the acquired unit configuration information as a second hierarchy, and the setting information as a third hierarchy,
wherein the generation device generates the screen data relating to the control device indicated by the device identification information, which is included in the hierarchization information and provided by the server, by combining the setting information with the unit configuration information included in the hierarchization information provided by the server, without managing the device address associated with the control device.

2. The screen data generating system according to claim 1, wherein the setting information includes a label of the operating state of the unit and an address of the unit that indicates an area in which data indicating the operating state is stored.

3. The screen data generating system according to claim 1, wherein
the server storage stores multiple pieces of the setting information, and
the server reads, from the server storage, the setting information corresponding to the unit configuration information acquired from the control device.

4. The screen data generating system according to claim 1, wherein
the generation device
includes a template storage to store a template of the screen data, and
generates the screen data by combining the setting information with the template including the unit configuration information.

5. The screen data generating system according to claim 4, wherein
the unit configuration information indicates at least one of a type of the unit or a model of the unit, and
the generation device generates the screen data from the template including at least one of the type indicated by the unit configuration information included in the hierarchization information or the model indicated by the unit configuration information included in the hierarchization information.

6. The screen data generating system according to claim 4, wherein the generation device
further includes an image storage to store unit images that are multiple images of a plurality of the respective units, and
generates, from the template including location information that indicates locations of the respective unit images in the image storage, the screen data for displaying the monitoring screen including the unit images, the locations of the unit images corresponding to the unit configuration information.

7. A screen data generating system comprising:
a generation device to generate screen data for displaying a monitoring screen used for monitoring an operating state of a control device that controls an apparatus without managing a device address associated with the control device; and a server including a server storage to store setting information that indicates a setting for displaying, on the monitoring screen, an operating state of a unit included in the control device, the server being configured to acquire, from the control device, device identification information for identifying the control device and unit configuration information relating to the unit and to generate and provide hierarchization information in which the acquired device identification information, the acquired unit configuration information, and the setting information are hierarchized in order of the acquired device identification information as a first hierarchy, the acquired unit configuration information as a second hierarchy, and the setting information as a third hierarchy, wherein the generation device includes a template storage to store a template of the screen data, and an image storage to store unit images that are multiple images of a plurality of the respective units, and generates the screen data by combining the setting information with the template, without managing the device address associated with the control device, the screen data being data (i) relating to the control device indicated by the device identification information, which is included in the hierarchization information and provided by the sever, and (ii) for displaying the monitoring screen including the unit images, the template including the unit configuration information and including location information that indicates locations of the respective unit images in the image storage, the locations of the unit images corresponding to the unit configuration information included in the hierarchization information, the image storage stores a state display image and a state display table that are for displaying the operating state of the unit in association with the corresponding unit image of the unit images, the state display table includes a name of a screen component displaying the operating state, and a tag name for acquiring the operating state from the server, and the generation device stores, as the tag name and in the state display table, a label of the operating state indicated by the setting information included in the hierarchization information.

8. A method for generating screen data, the method comprising:

acquiring, by a server, from a control device that controls an apparatus, device identification information for identifying the control device and unit configuration information relating to a unit included in the control device, to generate and provide hierarchization information in which the acquired device identification information, the acquired unit configuration information, and setting information are hierarchized in order of the acquired device identification information as a first hierarchy, the acquired unit configuration information as a second hierarchy, and the setting information as a third hierarchy, the setting information indicating a setting for displaying an operating state of the unit on a monitoring screen used for monitoring an operating state of the control device indicated by the device identification information; and generating, by a generation device, screen data for displaying the monitoring screen by combining the setting information with the unit configuration information included in the hierarchization information, without managing a device address associated with the control device.

9. A non-transitory computer readable recording medium storing a program for causing a computer to function as:

generation means for generating screen data for displaying a monitoring screen used for monitoring an operating state of a control device that controls an apparatus without managing a device address associated with the control device; and server means including server storage means for storing setting information that indicates a setting for displaying, on the monitoring screen, an operating state of a unit included in the control device, the server means acquiring, from the control device, device identification information for identifying the control device and unit configuration information relating to the unit to generate and provide hierarchization information in which the acquired device identification information, the acquired unit configuration information, and the setting information are hierarchized in order of the acquired device identification information as a first hierarchy, the acquired unit configuration information as a second hierarchy, and the setting information as a third hierarchy, wherein the generation means generates the screen data relating to the control device indicated by the device identification information, which is included in the hierarchization information and provided by the server means, by combining the setting information with the unit configuration information included in the hierarchization information provided by the server means, without managing the device address associated with the control device.

10. A method for generating screen data, the method comprising:

acquiring, by a server, from a control device that controls an apparatus, device identification information for identifying the control device and unit configuration information relating to a unit included in the control device, to generate and provide hierarchization information in which the acquired device identification information, the acquired unit configuration information, and setting information are hierarchized in order of the acquired device identification information as a first hierarchy, the acquired unit configuration information as a second hierarchy, and the setting information as a third hierarchy, the setting information indicating a setting for displaying an operating state of the unit on a monitoring screen used for monitoring an operating state of the control device;

generating, by a generation device, the screen data by combining the setting information with a template, without managing a device address associated with the control device, the screen data being data (i) relating to the control device indicated by the device identification information, which is included in the hierarchization information and acquired by the server, and (ii) for displaying the monitoring screen including unit images that are multiple images of a plurality of the respective units, the template including the unit configuration information and including location information that indicates locations of the respective unit images in an image storage, the locations of the unit images corresponding to the unit configuration information included in the hierarchization information; and storing, by the generation device, a label of an operating state indicated by the setting information included in the hierarchization information in a state display table that is stored in the image storage together with a state display image for displaying the operating state of the unit in association with the corresponding unit image of the unit images, the state display table including a name of a screen component displaying an operating state and a tag name for acquiring the operating state from the server, the label being stored as the tag name.

11. A non-transitory computer readable recording medium storing a program for causing a computer to function as:
  a generation device to generate screen data for displaying a monitoring screen used for monitoring an operating state of a control device that controls an apparatus without managing a device address associated with the control device; and
  a server including a server storage for storing setting information that indicates a setting for displaying, on the monitoring screen, an operating state of a unit included in the control device, the server being configured to acquire, from the control device, device identification information for identifying the control device and unit configuration information relating to the unit and to generate and provide hierarchization information in which the acquired device identification information, the acquired unit configuration information, and the setting information are hierarchized in order of the acquired device identification information as a first hierarchy, the acquired unit configuration information as a second hierarchy, and the setting information as a third hierarchy,
wherein the generation device
  includes a template storage to store a template of the screen data, and an image storage to store unit images that are multiple images of a plurality of the respective units, and
  generates the screen data by combining the setting information with the template, without managing the device address associated with the control device, the screen data being data (i) relating to the control device indicated by the device identification information, which is included in the hierarchization information and provided by the server, and (ii) for displaying the monitoring screen including the unit images, the template including the unit configuration information and including location information that indicates locations of the respective unit images in the image storage, the locations of the unit images corresponding to the unit configuration information included in the hierarchization information.

* * * * *